US012709988B2

(12) United States Patent
Parmentier et al.

(10) Patent No.: US 12,709,988 B2
(45) Date of Patent: Aug. 18, 2026

(54) AIRCRAFT TURBINE ENGINE WITH A HYBRID COMPRESSOR

(71) Applicant: SAFRAN, Paris (FR)

(72) Inventors: Nicolas Claude Parmentier, Moissy-Cramayel (FR); William Henri Joseph Riera, Moissy-Cramayel (FR)

(73) Assignee: SAFRAN, Paris (FR)

( * ) Notice: Subject to any disclaimer, the term of this patent is extended or adjusted under 35 U.S.C. 154(b) by 0 days.

(21) Appl. No.: 17/904,670

(22) PCT Filed: Feb. 2, 2021

(86) PCT No.: PCT/FR2021/050181

§ 371 (c)(1),
(2) Date: Aug. 19, 2022

(87) PCT Pub. No.: WO2021/176152

PCT Pub. Date: Sep. 10, 2021

(65) Prior Publication Data

US 2023/0094812 A1 Mar. 30, 2023

(30) Foreign Application Priority Data

Mar. 3, 2020 (FR) ...................................... 2002121

(51) Int. Cl.
*F01D 15/10* (2006.01)
*B64D 27/33* (2024.01)
(Continued)

(52) U.S. Cl.
CPC ................ *F01D 15/10* (2013.01); *F02K 5/00* (2013.01); *B64D 27/02* (2013.01); *B64D 27/33* (2024.01); *F05D 2220/76* (2013.01)

(58) Field of Classification Search
CPC ..................................................... B64D 27/33
See application file for complete search history.

(56) References Cited

U.S. PATENT DOCUMENTS 5,680,754 A * 10/1997 Giffin .................... F04D 29/542 60/226.1
2004/0070211 A1* 4/2004 Franchet ................... F02C 7/32 290/31
(Continued)

FOREIGN PATENT DOCUMENTS

EP 3667042 A2 6/2020
FR 2842565 A1 1/2004

OTHER PUBLICATIONS

International Search Report received for PCT Patent Application No. PCT/FR2021/050181, mailed on Apr. 26, 2021, 5 pages (2 pages of English Translation and 3 pages of Original Document).

*Primary Examiner* — Lorne E Meade
*Assistant Examiner* — Alyson Joan Harrington
(74) *Attorney, Agent, or Firm* — Womble Bond Dickinson (US) LLP

(57) ABSTRACT

The invention relates to an aircraft turbine engine (101) which comprises, downstream of the low pressure compressor of its low pressure body (104) and upstream of its combustion chamber (102), an electric motor (206) which is configured to rotate a rotor blade ring so as to generate a flow of air. Moreover, the rotational speed of the electric machine rotor is independent of the rotational speed of the compressor rotor.

8 Claims, 4 Drawing Sheets

(51) Int. Cl.
*F02K 5/00* (2006.01)
*B64D 27/02* (2006.01)

(56) References Cited

U.S. PATENT DOCUMENTS

| | | | | |
|---|---|---|---|---|
| 2009/0289456 | A1 | 11/2009 | Mcloughlin et al. | |
| 2014/0364265 | A1 | 12/2014 | Bentgen et al. | |
| 2017/0260872 | A1* | 9/2017 | Munevar | B64D 31/18 |
| 2019/0136768 | A1* | 5/2019 | Harvey | H02K 49/104 |
| 2019/0145322 | A1* | 5/2019 | Sellick | F02C 7/36 290/52 |
| 2019/0264615 | A1* | 8/2019 | Husband | F02C 7/262 |
| 2020/0182158 | A1* | 6/2020 | Kupratis | F01D 21/003 |
| 2020/0340406 | A1* | 10/2020 | Maljean | H02K 7/1823 |

* cited by examiner

AIRCRAFT TURBINE ENGINE WITH A HYBRID COMPRESSOR

TECHNICAL FIELD OF THE INVENTION

The invention relates to the general field of aircraft turbine engines, and in particular to turbine engines of the turbojet engine type with double body and double-flow. It relates, in particular, to an aircraft turbine engine which comprises, downstream of the low-pressure compressor of its low-pressure body, an electric machine coaxial with the low-pressure body and configured to drive in rotation a movable vane ring.

TECHNICAL BACKGROUND

The prior art comprises in particular the documents US-A1-2019/145322, US-A1-2009/289456 and US-A1-2014/364265.

In a conventional way, an aircraft turbine engine of the turbojet engine type with double body (i.e., with a low-pressure body and a high-pressure body) comprises from upstream to downstream, in the direction of the gas flow, a fan, a low-pressure compressor, a high-pressure compressor, a combustion chamber, a high-pressure turbine and a low-pressure turbine. The rotor of the low-pressure compressor is driven by the rotor of the low-pressure turbine, and the rotor of the high-pressure compressor is driven by the rotor of the high-pressure turbine.

In this type of turbine engine, the low-pressure compressor (also referred to as booster) must be able to operate over a wide range of operating regimes, typically from 25% to 105% of its nominal operating regime. In particular, one challenge is to avoid, over this entire operating regime range, the known phenomenon of pumping, which causes a poor flow of the gases in the turbine engine or even a reversal of the direction of flow of these gases.

This objective constrains the design of the low-pressure compressor. In fact, typically, in order to guarantee a good operation of the compressor, including at low regime, a variable geometry is integrated into the turbine engine or means of discharge the bladings. In the most common case, the turbine engine comprises a discharge valve located downstream of the low-pressure compressor in the direction of gas flow, commonly referred to as VBV (Variable Bleed Valve). In some cases, it also comprises an input steering wheel (RDE) with variable pitch.

In any cases, the addition of such systems is intended to better control the flow through the low-pressure compressor at any operating regime. However, their integration degrades the quality of the aerodynamic duct (due to the introduction of clearances, slits, leaks) and therefore also results in a degradation of the performance of the turbine engine at its nominal operating point. In addition, the addition of variable geometries (VBV, RDE, etc.) compensates for some of the operating losses of the low-pressure compressor, but not all. Indeed, their deflection (i.e. their capacity to modify the flow) is limited by integration constraints, and leads to limited corrective capacities.

This problem remains unchanged for a turbine engine equipped with a reducer whose role is only to impose a constant speed ratio between the fan and the low-pressure compressor of the turbine engine. The speed range, and therefore the operating regime range of the low-pressure compressor, is always dictated by the low-pressure turbine.

In addition, there are turbine engines referred to as triple bodies in which an intermediate compressor has its rotor driven by a turbine independent of the fan and of the high-pressure body. However, although the operating regime range of this compressor is reduced to between that of the high-pressure compressor and that of the low-pressure compressor, it remains wide and still requires the integration of a discharge valve.

The patent FR 2842565 B1 describes a turbine engine that integrates an electric machine in its front enclosure. This electric machine can provide a torque to the rotor of the low-pressure compressor as the rotor of the electric machine and that of the compressor are secured. This injection of power to the rotor of the low-pressure compressor allows to optimize its performance at certain operating regimes, but at the same time degrades the operability of the high-pressure compressor (i.e. the operating regime range in which it operates optimally). Such an approach therefore requires a compromise.

In general, the alternatives known so far to the use of a variable geometry, which rely on an electric machine to improve the performance of the low-pressure compressor, improve the operability of the low-pressure compressor but degrade that of the fan and/or the high-pressure compressor.

SUMMARY OF THE INVENTION

The present invention proposes a solution, based on the use of an electric machine, allowing to drive in rotation a movable vane ring, located downstream of the low-pressure compressor, so as to generate a flow of air independently of the speed of rotation of the rotor of the compressor.

To this end, according to a first embodiment, the invention concerns an aircraft turbine engine comprising at least one combustion chamber and a body, in particular low-pressure, said body comprising, upstream of said chamber, an axial compressor, in particular low-pressure, intended to deliver air to said chamber and, downstream of said chamber, a turbine receiving hot gases from said chamber and intended to drive the rotor of said compressor, said compressor comprising at least one compression stage having a first stationary vane ring secured to a casing and a first movable vane ring extending radially at the periphery of said rotor of the compressor, said turbine engine being characterised in that it furthermore comprises, downstream of said compressor and upstream of said chamber, at least one electric machine which is coaxial or parallel to said body, the stator of which is secured to said casing and the rotor of which drives in rotation a second movable vane ring configured to generate a flow of air when it is set in rotation, said rotor of the electric machine being furthermore guided in rotation by at least one bearing secured to said casing so that the speed of rotation of said rotor of the electric machine is independent of the speed of rotation of the rotor of the compressor.

The device according to the invention may comprise one or more of the following characteristics, taken alone or in combination with each other:

- the turbine engine is of the dual-body type, and in which a high-pressure compressor of a high-pressure body is located downstream of the low-pressure compressor and of the electric machine and upstream of the combustion chamber, said turbine engine being furthermore double-flow with a low-pressure body and a high-pressure body located in a flow duct of a primary flow.
- the electric machine is of the annular type and comprises a hollow shaft configured to drive the second movable vane ring in rotation.

- the turbine engine comprises a plurality of electric machines configured to rotate, by means of gears, the second movable vane ring.
- the compressor comprises a plurality of compression stages, the electric machine being located downstream of the last stage of said compressor and upstream of the combustion chamber, the rotor of the electric machine rotating in the same direction of rotation as the rotor of said compressor and a second stationary vane ring being located downstream of and adjacent to the second movable vane ring.
- the compressor comprises a single compression stage constituted by a radial segment of a fan of the turbine engine, the electric machine being located downstream of said stage and a second stationary vane ring being located downstream of and adjacent to the second movable vane ring.
- the compressor comprises a plurality of compression stages, each compression stage comprising a movable vane ring, the electric machine being located downstream of and adjacent to the last movable vane ring of said compressor and the direction of rotation of the rotor of said electric machine being opposite to that of the rotor of the compressor.
- a second stationary vane ring is located downstream of and adjacent to the second movable vane ring.

The invention also relates, according to a second embodiment, to a method for controlling an electric machine of an aircraft turbine engine according to the first embodiment, said method comprising the following steps, executed by a control unit:

a) receiving characteristic data of an operating point of the turbine engine at a given time;
b) determining, from the received data, a target operating regime of the electric machine;
c) determining a target power of the electric machine from the target operating regime;
d) comparing the instantaneous power of the electric machine and the determined target power and, if the difference between the instantaneous power and the target power is less than a determined threshold, returning to the step b), otherwise,
e) changing the operating regime of the electric machine intended to achieve the target power; and,
f) determining the instantaneous power of the electric machine and returning to the step d).

In addition, the characteristic data of an operating point of the turbine engine may comprise, at least one of the following data:

- the operating regime of the low-pressure compressor of the turbine engine;
- the operating regime of the high-pressure compressor of the turbine engine;
- the pressure measured at the inlet of the high-pressure compressor of the turbine engine;
- the pressure measured at the inlet of the low-pressure compressor of the turbine engine;
- the temperature measured at the inlet of the low-pressure compressor of the turbine engine; and,
- the temperature measured at the inlet of the high-pressure compressor of the turbine engine.

BRIEF DESCRIPTION OF THE FIGURES

The invention will be better understood and other details, characteristics and advantages of the present invention will become clearer from the following description made by way of non-limiting example and with reference to the attached drawings, in which.

The elements having the same functions in the different embodiments have the same references in the figures.

DETAILED DESCRIPTION OF THE INVENTION

Figure 1:
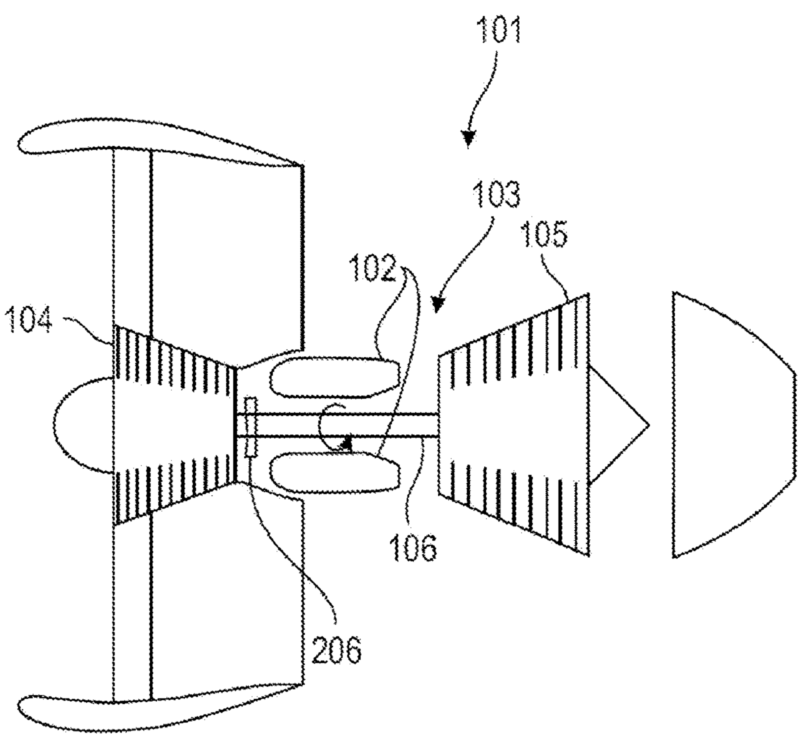
FIG. 1 is a simplified schematic description of an aircraft turbine engine according to an embodiment of the invention.
Figure 2:
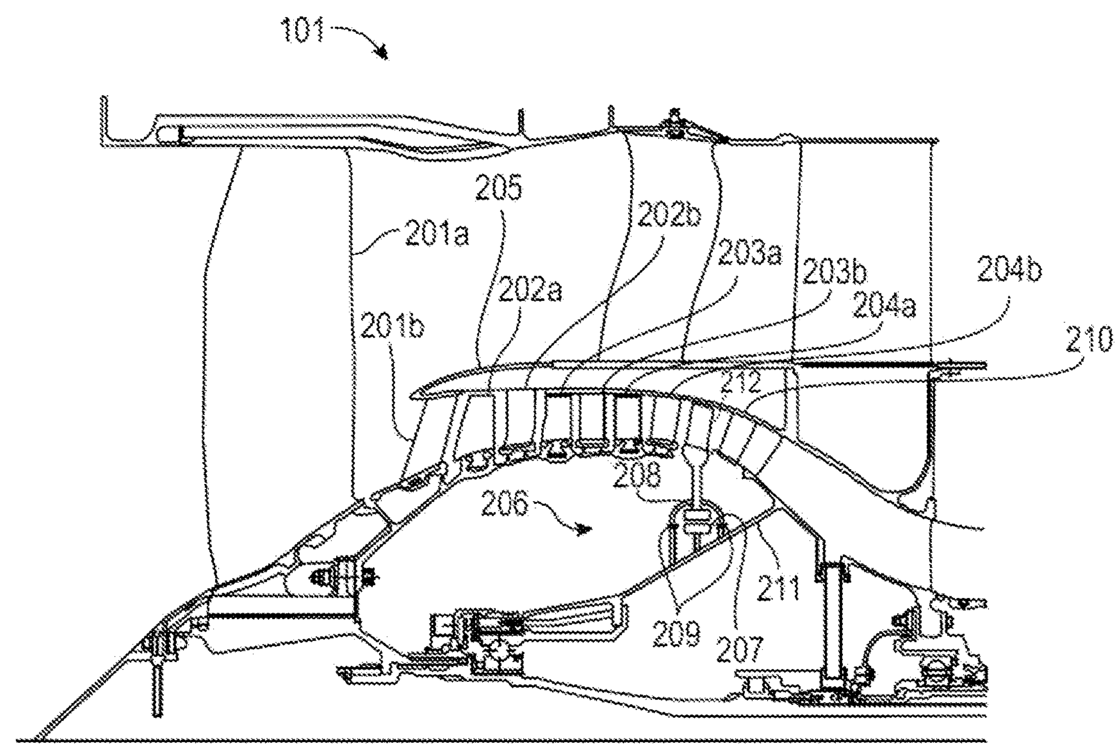
FIG. 2 is a schematic half-section of the front of an aircraft turbine engine according to a first embodiment of the invention.

With reference to FIG. 1 and FIG. 2, an aircraft turbine engine according to one embodiment of the invention will now be described. In the FIGS. 1 and 2, only one low-pressure body is shown. However, the person skilled in the art will appreciate that the invention also applies to a dual-body turbine engine, i.e., a turbine engine that comprises both a low-pressure body, which comprises a fan, a low-pressure compressor and a low-pressure turbine, and a high-pressure body, which comprises a high-pressure compressor and a high-pressure turbine. In addition, such a turbine engine can be, for example, a dual-body and double-flow turbojet engine (also referred to as turbofan) for which the low-pressure body and the high-pressure body are located in the flow duct of the primary flow.

In the following, the terms "upstream" and "downstream" are defined in reference to the direction of flow of the gases in the turbine engine.

The aircraft turbine engine 101 comprises a combustion chamber 102 and a low-pressure body 103. The low-pressure body 103 comprises, upstream of the chamber 102, an axial low-pressure compressor 104 which is intended to deliver air to the chamber and, downstream of the chamber, a turbine 105 which receives the hot gases from the chamber and which is intended to drive the rotor 106 of the compressor.

In the example shown in FIG. 2, the compressor comprises four compression stages 201, 202, 203, 204, each of which has a first stationary vane ring 201_b_, 202_b_, 203_b_, 204_b_ secured to the casing 205 and a first movable vane ring 202_a_, 203_a_, 204_a_ that extend radially around the periphery of the rotor of the compressor. The fan 201_a_, located upstream of the compressor, drives the flow which is straightened by the first stationary vane ring 201_b_. The person skilled in the art will appreciate, however, that the invention is not limited to this number of stages and that it applies in general to an aircraft turbine engine whose low-pressure compressor comprises at least one compression stage. Throughout the specification, "stationary vane ring" is equivalent to a ring or annular row of stator vanes and "movable vane ring" is equivalent to a ring or annular row of rotor blades.

In any cases, the turbine engine also comprises, downstream of the compressor and upstream of the chamber, an electric machine 206 which is coaxial with the low-pressure body 103, the stator 207 of which is secured to the casing 205 and the rotor 208 of which drives the movable vane ring 212 in rotation. This electric machine is configured to generate an air flow, by means of the movable vane ring, when it is rotated. In addition, the rotor of the electric machine is guided in rotation by bearings 209 secured to the casing (by means of the shroud 211) so that the rotational speed of the rotor of the electric machine is independent of the rotational speed of the rotor of the compressor. In other words, the electric machine can be started, stopped, accelerated or decelerated regardless of the operating regime of the low-pressure compressor. In addition, according to different embodiments of the turbine engine, the direction of rotation of the rotor of the electric machine can be the same or opposite to that of the rotor of the low-pressure compressor.

In the example shown in FIG. 2, a stationary vane ring 210 is located downstream and adjacent to the second movable vane ring 212. These stationary vanes straighten the flow generated by the movable vanes. Thus, the electric machine with the movable vane ring and the adjacent stationary vane ring can be regarded as a self-contained final stage of the low-pressure compressor. As will become clear later on, the speed of rotation of the rotor of the electric machine can be controlled and regulated according to selected parameters to optimize the aerodynamic operation of the assembly comprising the low-pressure compressor and the electric machine. The control of the rotational speed of the rotor of the electric machine thus allows a greater flexibility in the use of the entire low-pressure compressor.

In addition, in the case of a double-body turbine engine, the electric machine can be supplied, via a power electronics, by a generator driven by the high-pressure body.

Advantageously, the better control of the flow of the gases that the integration of the electric machine allows consequently allows to better avoid the pumping phenomenon. In addition, the use of the electric machine also allows, if necessary, to maintain a flow of air, for example in the primary duct of a turbojet engine with double-flow, in phases referred to as stopped engine (thermal). This flow can be used, for example, for a maintenance function linked to the washing of a body, to help with start-up, to generate energy in the event of autorotation of the fan, or to cool the engine between two successive flights so as to prevent the deformation elements of the rotor linked to overheating (which imposes a waiting time before restarting).

Figure 3:
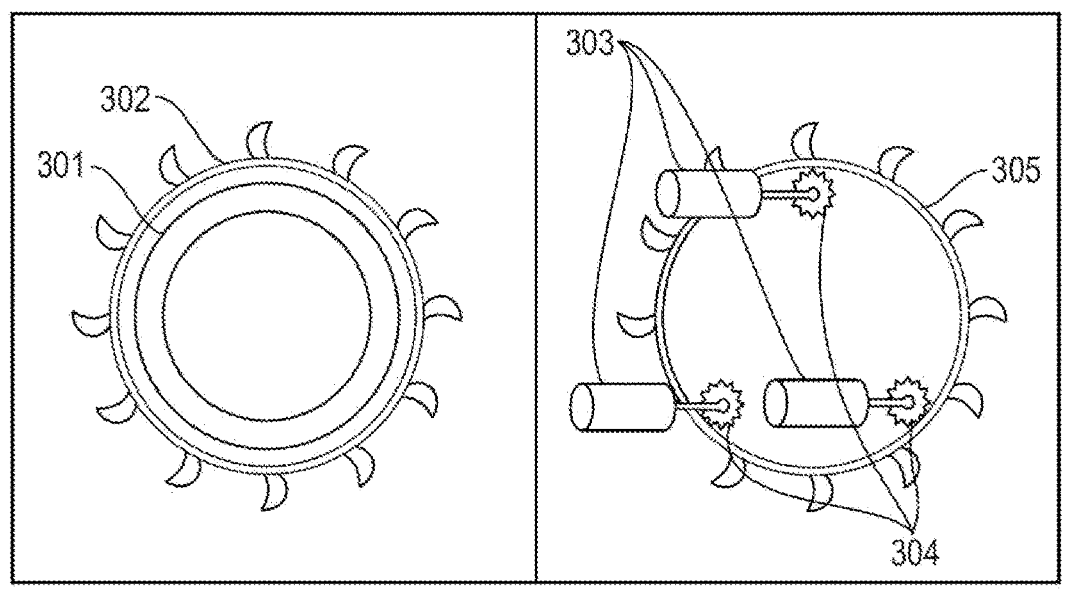
FIG. 3 is a schematic representation of embodiments of electric machines according to the invention.

With reference to FIG. 3, embodiments of electric machines according to the invention will now be described.

The left portion of FIG. 3 shows an annular-type electric machine 301, having a hollow shaft with a large internal diameter, which is configured to drive in rotation the movable vane ring 302.

The right portion of FIG. 3 depicts a plurality of electric machines 303 that are configured to rotate the movable vane ring 305, by means of the gears 304. In this embodiment, the electric machines 303 are parallel to the low-pressure body, i.e., they extend along an axis that is parallel to the longitudinal extent axis of the body.

Depending on the embodiment of the electric machine or the electric machines, the bearing or the bearings that guide the rotor of each machine may be integrated to the machines or positioned between the rotor of the machine and an element of the casing of the turbine engine.

Figure 4:
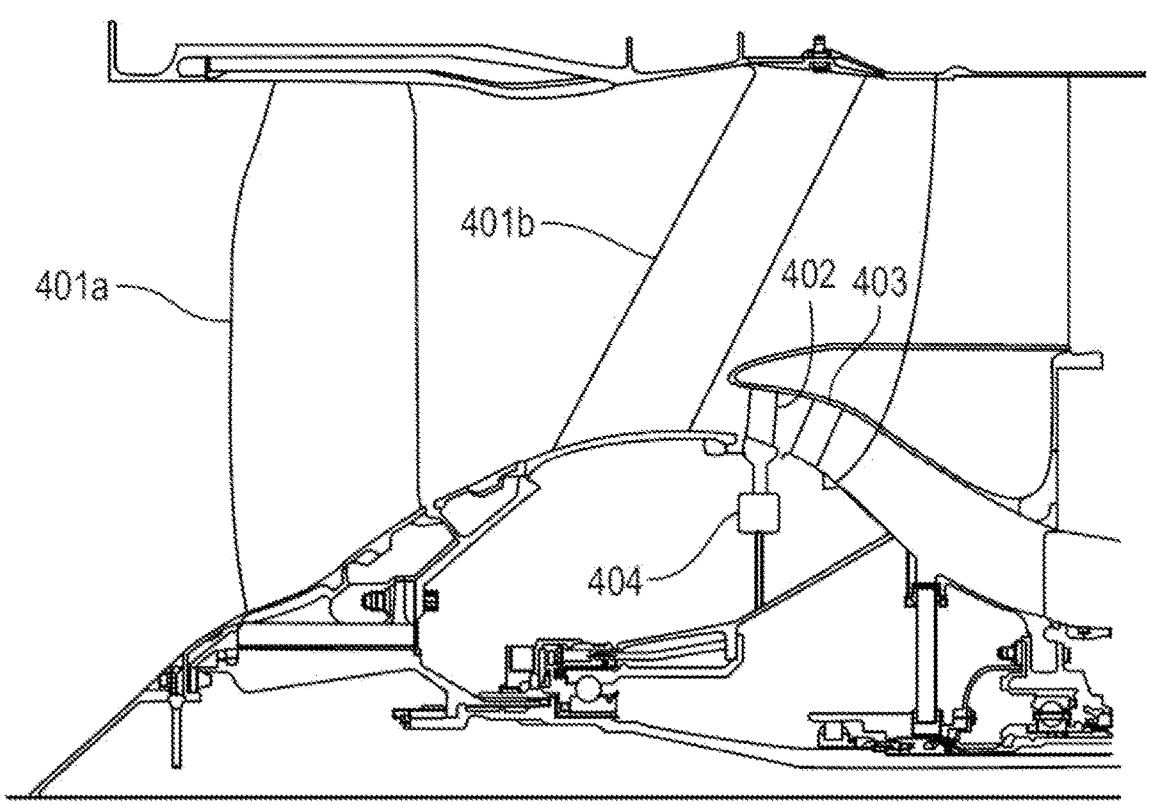
FIG. 4 is a schematic half-section of the front of an aircraft turbine engine according to a second embodiment of the invention.
Figure 5:
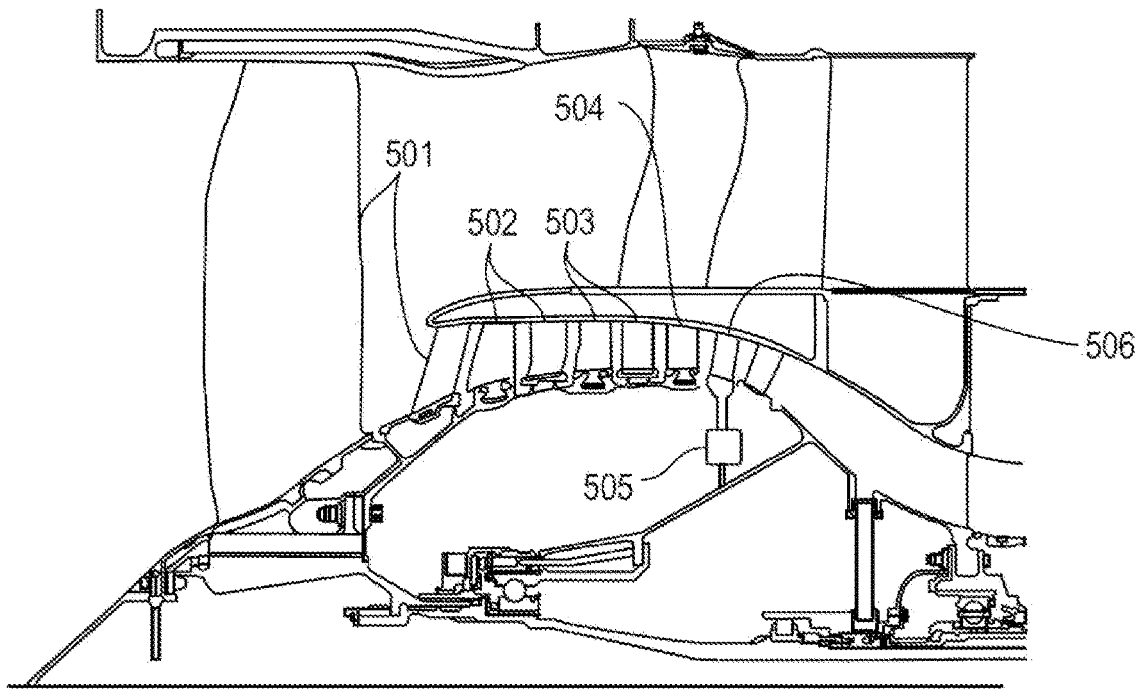
FIG. 5 is a schematic half-section of the front of an aircraft turbine engine according to a third embodiment of the invention.
Figure 6:
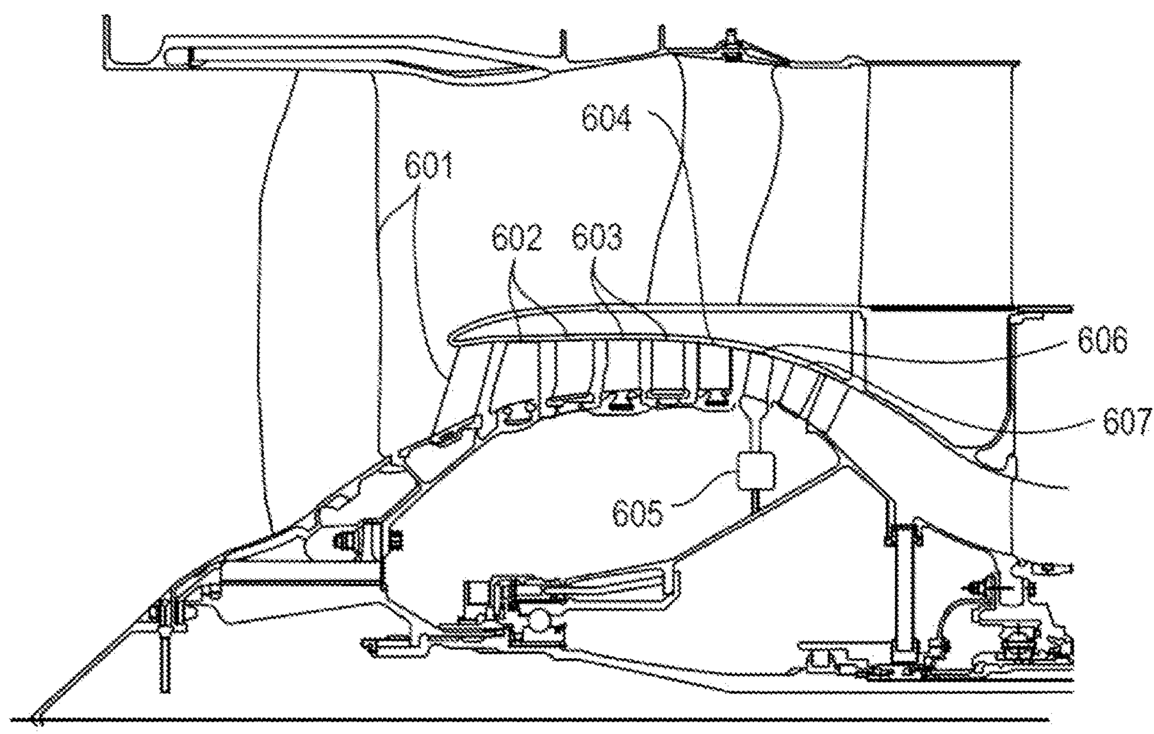
FIG. 6 is a schematic half-section of the front of an aircraft turbine engine according to a fourth embodiment of the invention.

FIGS. 4, 5 and 6 show different embodiments of an aircraft turbine engine according to the invention.

In the embodiment shown with reference to FIG. 4, the low-pressure compressor comprises only one compression stage 401 consisting of a radial segment of the fan 401*a* of the turbine engine and a stationary vane ring 401*b*. The electric machine 404 is located downstream of this compression stage and another stationary vane ring 403 is located downstream and adjacent to the movable vane ring 402. Advantageously, this embodiment allows to maintain a high compression ratio in a turbine engine whose low-pressure compressor comprises only one compression stage and for which it is complex or even impossible to integrate a system such as a variable discharge valve.

In the embodiment shown with reference to FIG. 5, the low-pressure compressor comprises a plurality of compression stages 501, 502, 503 and 504 with each compression stage comprising a movable vane ring. The electric machine 505 is located downstream and adjacent to the last movable vane ring 504 of the compressor (which constitutes its last compression stage) and the direction of rotation of the rotor of said electric machine is opposite to that of the rotor of the compressor. In this case, the control of the electric machine is adapted so that the movable vane ring 506 minimizes the gyration of the flow at the outlet of the movable vane ring 504. This allows to avoid using the straightener (stator) located downstream of said movable vane ring 506.

The last embodiment, shown with reference to FIG. 6, uses a similar architecture to the embodiment shown with reference to FIG. 5, but additionally comprises a stationary vane ring 607 located downstream and adjacent to the movable vane ring 606. It is this movable vane ring that then straightens the flow.

Figure 7:
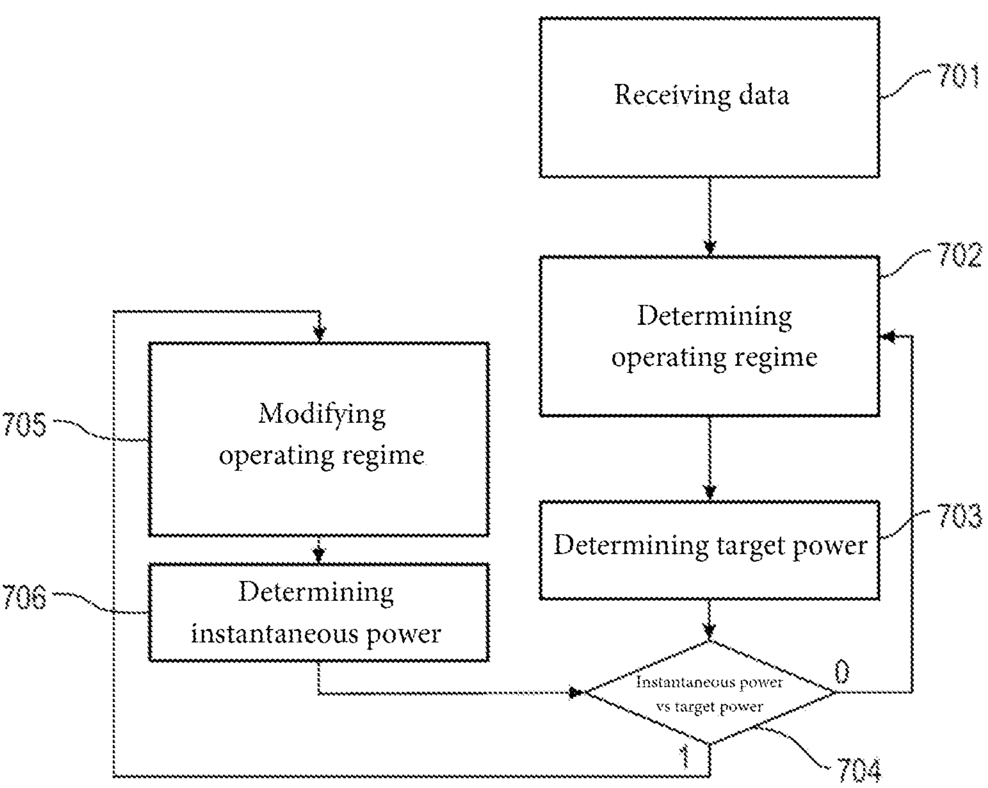
FIG. 7 is a step diagram of a method for controlling an aircraft turbine engine according to an embodiment of the invention.

With reference to FIG. 7, we will now describe an embodiment of a method for controlling an electric machine of an aircraft turbine engine according to the invention. The steps of the method are executed by a control unit.

The step 701 consists of receiving characteristic data of an operating point of the turbine engine at a given time. This characteristic data can be, for example, comprised among at least one of the following data:

- the operating regime of the low-pressure compressor of the turbine engine;
- the operating regime of the high-pressure compressor of the turbine engine;
- the pressure measured at the inlet of the high-pressure compressor of the turbine engine;
- the pressure measured at the inlet of the low-pressure compressor of the turbine engine;
- the temperature measured at the inlet of the low-pressure compressor of the turbine engine; and,
- the temperature measured at the inlet of the high-pressure compressor of the turbine engine.

Furthermore, the person skilled in the art will know how to select data, for example measured by sensors or determined from the electric machine, suitable for allowing to optimize the aerodynamic performance of the low-pressure compressor by controlling the electric machine.

The step 702 consists in determining, based on the received data, a target operating regime of the electric machine. The target operating regime is an operating regime allowing to optimize the flow in the aerodynamic duct and avoids the pumping.

The step 703 consists in determining, from the target operating regime, a target power of the electric machine. In other words, the target power is the power that corresponds to the target operating regime.

During the step 704, the control unit compares the instantaneous power of the electric machine and the target power determined in the step 703.

If the difference between the instantaneous power and the target power is less than a given threshold, then the method resumes at the step 702.

Otherwise, the step 705 is realized. This step consists of modifying the operating regime of the electric machine in order to reach the target power.

Finally, the step 706 consists of determining the instantaneous power of the electric machine and returning to the step 704 to compare this power with the target power again.

The invention claimed is:

1. An aircraft turbine engine comprising at least one combustion chamber, a high-pressure compressor and a low-pressure body, said high-pressure compressor upstream of said at least one combustion chamber, said low-pressure body comprising an axial low-pressure compressor; upstream of said high-pressure compressor, said high-pressure compressor configured to deliver air to said at least one combustion chamber and, downstream of said at least one combustion chamber, a turbine receiving hot gases from said at least one combustion chamber and configured to drive a rotor of said axial low-pressure compressor, said axial low-pressure compressor comprising a plurality of compression stages each having a ring of rotor blades extending radially at a periphery of said rotor of the axial low-pressure compressor and a respective ring of stator vanes secured to a casing, wherein a first compression stage of the plurality of compression stages is a fan stage comprising a ring of fan rotor blades and a respective first ring of stator vanes, and downstream of the fan stage are booster stages of the plurality of compression stages, each of the booster stages comprising a respective ring of booster rotor blades and a respective ring of booster stator vanes, wherein said aircraft turbine engine further, comprises at least one electric machine located downstream of the last of the booster stages of said axial low-pressure compressor and upstream of said high-pressure compressor, the at least one electric machine is coaxial or parallel to said low-pressure body, a stator of the at least one electric machine is secured to said casing and a rotor of the at least one electric machine drives in rotation an additional ring of rotor blades downstream of the last of the booster stages and upstream of the high-pressure compressor, the additional ring of rotor blades configured to generate a flow of air when the additional ring of rotor blades is rotated, a respective additional ring of stator vanes secured to the casing being located downstream of and adjacent to the additional ring of rotor blades, and said rotor of the at least one electric machine being furthermore guided in rotation by at least one bearing secured to said casing so that a speed of rotation of said rotor of the at least one electric machine is independent of a speed of rotation of the rotor of the axial low-pressure compressor and independent of a speed of rotation of the high-pressure compressor, and wherein the rotor of the at least one electric machine rotates in the same direction of rotation as the rotor of said axial low-pressure compressor.

2. The aircraft turbine engine according to claim 1, said aircraft turbine engine being of a dual-body type, and wherein a high-pressure body comprises the high-pressure compressor, the high-pressure compressor is located downstream of the axial low-pressure compressor, of the additional ring of rotor blades and the respective additional ring of stator vanes, and of the at least one electric machine and upstream of the at least one combustion chamber, said aircraft turbine engine further being double-flow with the low-pressure body and the high-pressure body located in a flow duct of a primary flow.

3. The aircraft turbine engine according to claim 1, wherein the at least one electric machine is of an annular type and comprises a hollow shaft configured to drive the additional ring of rotor blades in rotation.

4. The aircraft turbine engine according to claim 1, comprising a plurality of electric machines configured to rotate, by means of gears, the additional ring of rotor blades.

5. The aircraft turbine engine of claim 1, wherein the at least one electric machine is configured to rotate the rotor of the at least one electric machine in two directions of rotation.

6. The aircraft turbine engine of claim 1, wherein the at least one bearing is integrated to the at least one electric machine.

7. A method for controlling an electric machine of an aircraft turbine engine according to claim 1, said method comprising the following steps, executed by a control unit:

a) receiving characteristic data of an operating point of the aircraft turbine engine at a given time;

b) determining, from the received data, a target operating regime of the at least one electric machine;

c) determining, from the target operating regime, a target power of the at least one electric machine;

d) comparing instantaneous power of the at least one electric machine and the target power and, if a difference between the instantaneous power and the target power is less than a determined threshold, returning to the step b), otherwise, e) changing the target operating regime of the at least one electric machine intended to achieve the target power; and, f) determining the instantaneous power of the at least one electric machine and returning to the step d).

8. The method according to claim 7, said aircraft turbine engine being of a dual-body type, and wherein a high-pressure body comprises the high-pressure compressor, the high-pressure compressor is located downstream of the axial low-pressure compressor, of the additional ring of rotor blades and the respective additional ring of stator vanes, and of the at least one electric machine and upstream of the at least one combustion chamber, said aircraft turbine engine further being double-flow with the low-pressure body and the high-pressure body located in a flow duct of a primary flow wherein the characteristic data of an operating point of the aircraft turbine engine at a given time comprises, at least one of the following data:

an operating regime of the axial low-pressure compressor of the aircraft turbine engine;

an operating regime of the high-pressure compressor of the aircraft turbine engine;

a pressure measured at an inlet of the high-pressure compressor of the aircraft turbine engine;

a pressure measured at an inlet of the axial low-pressure compressor of the aircraft turbine engine;

a temperature measured at the inlet of the axial low-pressure compressor of the aircraft turbine engine; and, a temperature measured at the inlet of the high-pressure compressor of the aircraft turbine engine.

* * * * *